United States Patent [19]
Roeker et al.

[11] Patent Number: 5,340,649
[45] Date of Patent: Aug. 23, 1994

[54] MICROWAVEABLE ADHESIVE ARTICLE AND METHOD OF USE

[75] Inventors: David C. Roeker, Hudson, Wis.; David F. Slama, Vadnais Heights; William F. Sheffield, Oakdale, both of Minn.

[73] Assignee: Minnesota Mining and Manufacturing, St. Paul, Minn.

[21] Appl. No.: 907,899

[22] Filed: Jul. 2, 1992

Related U.S. Application Data

[63] Continuation-in-part of Ser. No. 725,188, Jul. 3, 1991, abandoned.

[51] Int. Cl.$^5$ .............................................. C09J 7/02
[52] U.S. Cl. ...................... 428/344; 428/345; 428/349
[58] Field of Search .................... 428/349, 344, 345

[56] References Cited

U.S. PATENT DOCUMENTS

| | | | |
|---|---|---|---|
| 2,606,856 | 8/1952 | Hurrey et al. | 154/126.5 |
| 3,152,950 | 10/1964 | Palmquist et al. | 161/214 |
| 3,461,014 | 8/1969 | James | 156/272 |
| 3,528,867 | 9/1970 | Leatherman et al. | 156/272 |
| 3,990,124 | 11/1976 | MacKay, Jr. et al. | 15/230.12 |
| 4,149,294 | 4/1979 | MacKay, Jr. et al. | 15/230.12 |
| 4,267,420 | 5/1981 | Brastad | 219/10.55 |
| 4,283,427 | 8/1981 | Winters et al. | 426/107 |
| 4,339,295 | 7/1982 | Boretos et al. | 156/275.7 |
| 4,401,545 | 8/1983 | Naarmann et al. | 204/291 |
| 4,607,412 | 8/1986 | Ashworth | 15/230.18 |
| 4,626,642 | 12/1986 | Wang et al. | 219/10.55 |
| 4,684,554 | 8/1987 | Ou-Yang | 428/35 |
| 4,707,402 | 11/1987 | Thorsrud | 428/328 |
| 4,906,497 | 3/1990 | Hellmann et al. | 428/49 |
| 4,962,000 | 10/1990 | Emslander et al. | 428/461 |
| 4,985,300 | 1/1991 | Huang | 428/332 |
| 5,001,804 | 3/1991 | Roeker et al. | 15/230.12 |

FOREIGN PATENT DOCUMENTS

0282015 9/1988 European Pat. Off. .
1198801 7/1970 United Kingdom .

*Primary Examiner*—Jenna L. Davis
*Attorney, Agent, or Firm*—Gary L. Griswold; Walter N. Kirn; Dale A. Bjorkman

[57] ABSTRACT

An adhesive article for use in a microwave oven is provided having a hot-melt or heat-curable adhesive substrate, and a susceptor layer of electrically conductive or semi-conductive microwave absorbing material that is disposed on at least a portion of the substrate. The article becomes less absorbent of microwave radiation upon the melting or deformation of the substrate. This article is suitable for adhering one adherend to another by exposing said article containing a hot-melt adhesive substrate to microwave energy.

17 Claims, 5 Drawing Sheets

MICROWAVEABLE ADHESIVE ARTICLE AND METHOD OF USE

This is a continuation-in-part of Ser. No. 725,188 filed Jul. 3, 1991, now abandoned.

BACKGROUND OF THE INVENTION

1. Field of the Invention

This invention relates to microwaveable adhesives. More particularly, this invention relates to hot melt adhesives or heat-curable adhesives that are activated by microwave energy.

2. Background of the Invention

Microwave radiation has become a widely used means for heating objects, particularly food. One advantage of microwave heating is that objects may be heated more quickly relative to conventional heating methods.

Microwave heating involves the portion of the electromagnetic spectrum between infrared and radio waves. Microwaves heat materials having an electric dipole. Water is by far the most common dipolar material. Typically, microwaves pass through an object and tend to align the dipoles. The microwave field reverses itself billions of times a second, which tends to cause the dipoles to rotate. The energy which is released by the rotating dipoles is converted into heat.

Polar materials such as water are not the only microwave receptors. Electrically conductive materials such as metals are also microwave receptors. However, the metal must be very thin or it will reflect almost all of the incident microwave energy rather than absorb the microwave energy.

An electrical conductor of proper thickness undergoes joule heating when irradiated with microwave energy. If a conductive layer is disposed on a nonconductive substrate, the substrate is heated by the transfer of thermal energy from the conductive layer. Joule heating of a conductive layer is generally much more efficient than simple dipole heating and results in heating rates that can be orders of magnitude greater than the heating rates accomplished through the interaction of microwave energy with dipoles.

When microwave energy impinges upon a conductive layer, the microwave energy induces electronic motions that give rise to a current in the conductive layer. Since the conductive layer has a resistance, energy in the form of heat, H, will be dissipated in accord with Joule's law which is $$H = I^2 R$$

where I is the current in the conductive layer in amperes and R is the resistance of the layer in ohms. Joule heating, however, takes place only as long as the conductive layer remains electrically continuous. If the conductive layer becomes electrically discontinuous, the current is reduced or eliminated and joule heating is correspondingly reduced or eliminated.

In addition, microwave radiation generated in a microwave oven is not always uniformly distributed throughout the oven. This non-uniformity can give rise to differential heating of the various regions in an object to be heated. Where the amount of microwave radiation is higher, the object heats more rapidly in that region and a hot-spot results.

Microwave radiation can also be used to heat hot-melt and heat-curable adhesives to their melt-flow or activation temperatures. The use of hot-melt adhesives in industry has steadily been increasing in past years, replacing aqueous and solvent-based adhesives. Hot-melt adhesive are particularly preferred because they do not release solvent into the atmosphere and also enjoy rapid set time characteristics. A hot-melt adhesive must be heated to its melt-flow temperature in order to allow the adhesive to flow and bond onto the surface of the adherends. This heating time is generally very short, but may be quite long particularly if the adhesive is in contact with a large mass that can act as a heat sink, or when the adhesive is separated from the heat source by insulating materials. In such circumstances, there exists a need for a method to heat up hot-melt adhesives at a rate faster than conventional thermal heating.

Heat-curable adhesives are adhesives that are chemically activated upon exposure to heat. The adhesives form bonds either when water or solvent is driven off, or when they are cross-linked, crystallized or otherwise initiated after exposure to heat.

U.S. Pat. No. 4,906,497 discloses microwave-activatable hot-melt adhesives. This reference describes an adhesive with an electrically conductive substance blended into the adhesive. The electrically conductive substance heats up faster than the adhesive, transferring the heat to the adhesive.

SUMMARY OF THE INVENTION

The instant invention provides a microwave actuable self-limiting adhesive article for use in a microwave oven which can be used to bond adherends. This adhesive article comprises:

a. a substrate consisting of a hot-melt or heat-curable adhesive; and b. a microwave susceptor layer of at least electrically semi-conductive microwave radiation absorbing material. The susceptor layer is disposed on at least a portion of the substrate, and is responsive to exposure to microwave radiation for raising the temperature of the substrate above a desired level sufficient to melt the substrate. The susceptor layer is deactivated when this temperature level is achieved.

This invention additionally provides for buff pads and a method of making them using the article wherein said substrate is a hot-melt or heat-curable adhesive.

DETAILED DESCRIPTION OF THE PRESENTLY PREFERRED EMBODIMENTS

The instant invention comprises a heat meltable or heat deformable substrate and a microwave susceptor layer of at least semi-conductive microwave radiation absorbing material that is disposed on at least a portion of the substrate.

By "self-limiting", it is meant the rate of heating of the adhesive article is reduced once the appropriate temperature level is reached, so that the adherends do not experience excessive temperatures.

Figure 1:
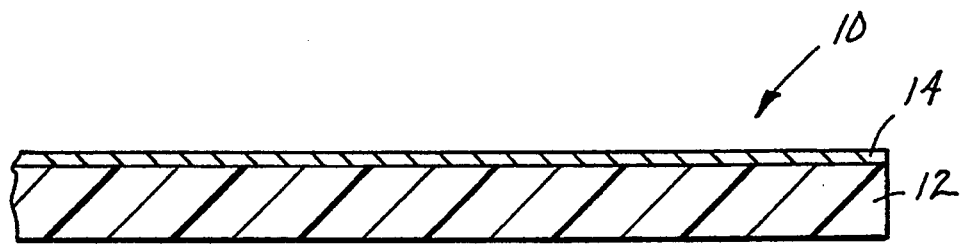
FIG. 1 is a cross-sectional view of the disclosed article.

FIG. 1 shows a cross-section of the disclosed article 10. Article 10 comprises substrate 12 and a microwave absorbing thin layer 14.

The adhesive substrate may be any material that will melt or deform when heated to a predetermined temperature in a microwave oven. The adhesive substrate may be selected such that the melt temperature is appropriately matched with the requirements of the adherends. For example, a low-melting point adhesive is appropriately used for adherends that are sensitive to high temperatures. Very high melting point adhesives may be used where the ultimate product will be exposed to high temperatures in normal use. Preferably, the substrate has low toxicity, especially when melted or deformed, has no strong or unpleasant odor. There is essentially no limitation on the types of hot-melt adhesives useful in the present invention. Hot-melt adhesives are adhesives that are applied to adherends in a molten stage, and form a bond on cooling to the solid state of the adhesive. Common hot-melts such as ethylene vinyl acetate, ethylene ethyl acrylate, ethylene acrylic acid, ethylene methacrylic acid, polyamides, polyethylene ethylene vinyl esters and mixtures thereof are just a few of the many types of hot-melt adhesive substrates envisioned for the present article. Additional examples include the alkyds, coumarone-indene, phenolic, rosin or terpene resins and mixtures thereof. A preferred hot-melt adhesive is a ethylene acrylic acid/polyethylene blend.

Heat-curable adhesives are activated on exposure to heat. For example, heat-curable adhesives may be activated by driving off water or solvent through the heating process. Alternatively, a heat-curable adhesive may be cross-linked or crystallized on exposure to heat. Examples of such adhesives include phenolic and amino resins, nitrile and neoprene rubbers, epoxy resins, certain isocyanate polymers and certain vinyl monomers such as methyl methacrylate and methyl 2-cyanoacrylate. Mixtures of these heat-curable adhesives are also contemplated.

Hot-melt or heat-curable adhesives are typically commercially available in sheet form in predetermined thicknesses. Alternatively, the adhesives may be obtained in a net or mesh format.

Additives may be added to the hot-melt or heat-curable adhesives such as tackifiers, fillers, antioxidants, waxes and other additives common to hot-melt or heat-curable adhesives.

The microwave susceptor layer is formed from a layer of metallic electrically conductive or semiconductive material. The susceptor layer of conductive material can be made of a single metal, a mixture of metals, an oxide of a metal, a mixture of oxides, or any combination of the foregoing. Preferably, the microwave susceptor layer has a sheet resistivity of greater than 0.2 ohm per square. Sheet resistivity is determined according to ASTM D 257-78 (reapproved 1983). The susceptor layer is generally less than 1% of the weight of the article and is often less than 0.01%. Metals that are suitable for the susceptor layer include magnetic metals; such as iron, nickel, magnetic stainless steel, or alloys; and non-magnetic metals such as aluminum, tin, tungsten, non-magnetic stainless steel, titanium, silver, gold, magnesium, copper, chromium or alloys.

The microwave susceptor layer can be applied to the substrate by means of metallizing processes such as evaporative vacuum deposition, sputter deposition, electroplating, electroless plating or other appropriate metallization processes.

The microwave susceptor layer preferably is sufficiently thin to prevent reflection, but it must also be sufficiently thick to absorb sufficient microwave energy for its intended purpose. The thickness of the microwave absorbing susceptor layer can preferably vary from 60 to 1,000 angstroms, and more preferably 70 to 170 angstroms for deposited metals and 200 to 2,000 angstroms for metal/metal oxide deposits. It is preferred that the resistivity of the microwave absorbing susceptor layer be uniform over its surface. A thicker layer may be required where the surface of the substrate is rough in order to assure the presence of a continuous microwave susceptor layer.

Another embodiment of the invention provides a coating of electrically conductive polymer that acts as a microwave radiation absorbing susceptor layer. Examples of such polymeric coatings include polypyrrole, polyaniline and polythiophene polymeric coatings wherein the polymers have been so doped to form electrically conductive coatings. To form these coatings, the monomers are polymerized in the presence of an oxidant and at least one non-nucleophilic anion at very low temperatures. The non-nucleophilic anion is incorporated into the polymer as a dopant. To prepare such conductive polymers, a solution containing an oxidant/dopant in an organic solvent or aqueous organic solvent is prepared; the solution is cooled, preferably by means of a dry ice bath, to a temperature sufficiently low such that the monomer for preparing the polymer capable of absorbing microwave energy will not polymerize prior to its being coated on a substrate; then the monomer for preparing the polymer capable of absorbing microwave energy is introduced to the cooled solution; next the resulting solution is coated onto the substrate. The temperature of the coating is then allowed to reach ambient temperature, whereupon a polymeric coating is formed. The coating is then washed with water to remove byproducts and allowed to dry.

The temperature of the coating solution must be sufficiently low such that the monomer for preparing the polymer capable of absorbing microwave energy will not polymerize prior to being deposited on the substrate. Polymerization on the substrate can be carried out at temperatures of from about $-20°$ C. to $70°$ C. Ambient temperatures are convenient because further heating or cooling will not be required. At elevated temperatures, the polymerization reaction occurs very rapidly, e.g., in about 10 seconds. Polymerization at lower temperatures, e.g., from about $-20°$ C. to about $30°$ C., is preferred for very conductive coatings. In the case of the monomer for preparing polypyrrole, the coating solution should be kept below $-25°$ C., preferably below $-40°$ C. Pyrrole, in the presence of an oxidant, begins to polymerize slowly at $-40°$ C. and polymerizes more rapidly as the temperature is increased.

Monomers suitable for preparing polypyrrole include, but are not limited to, pyrrole, 3-substituted pyrrole, 3,4-disubstituted pyrrole, N-substituted pyrrole, and mixtures thereof, wherein said substituents are chosen from alkyl groups or aryl groups. Alkyl groups can be linear or branched moieties having up to 12 carbon atoms, and optionally containing up to two heteroatoms selected from the group consisting of oxygen, nitrogen and sulfur.

Organic solvents suitable for the coating solution include aliphatic alcohols having up to and including six carbon atoms, e.g., methanol, ethanol. Organic solvents may contain up to 30% by volume water. Other organic solvents useful for the coating solution include 1,3-dioxolane, tetrahydrofuran, and diethyl ether.

Oxidants/dopants suitable for the coating solution include a salt of a cationic oxidant, such as, for example $(C_6H_5)_3C^+$, $Fe^{+3}$, $Cu^{+2}$, $Ce^{+4}$, in combination with a non-nucleophilic anion, e.g., a salt of a strong inorganic acid, such as $FeCl_3$, or $Fe(ClO_4)_3$, a salt of an organic mono or di-sulfonic acid, such as p-toluene-sulfonic acid. Alternatively, an organic sulfonic acid can be added to the solution in addition to the monomer and oxidant. Other oxidants that can be used in this process include the peroxy acids and their salts. The concentration of oxidant/dopant can vary, with the upper limit determined by the solubility of the oxidant/dopant at the selected temperature. The oxidant/dopant can comprise a mixture of an oxidant and dopant or a single material that functions as an oxidant and dopant.

Although the concentration of the oxidant and the dopant in the solvent can vary, the preferred range of concentrations of the oxidant/dopant in solvent is 2% to 40% by weight.

The concentration of the monomer is determined by the oxidative equivalent of the oxidant, the preferred ratio of oxidant to monomer being approximately 2.2:1 on a molar basis. The duration of polymerization prior to the rinse can range from 20 seconds to four minutes.

These polymers may be applied to the substrate by appropriate coating techniques such as gravure coating, roll coating, slot die coating, pattern coating, nozzles, spray applicators, knife coating, and any other coating means.

The microwave absorbing susceptor layer and substrate may be provided as separate layers that are placed in intimate physical contact with each other, but are not fused. In this configuration, the microwave absorbing susceptor layer would require a separate heat meltable or deformable carrier layer to provide structural support for the susceptor layer sufficient to assemble the article.

A construction comprising a carrier layer is less preferred because it requires the inclusion of an additional component. Structural support for the susceptor layer is preferably provided by the substrate itself, and preferably the susceptor layer is fused to the substrate, for example, by heat, pressure coating or other appropriate means. Also, the susceptor layer may be disposed substantially coextensive with the substrate or disposed in a predetermined pattern of localized areas.

The present invention also helps to provide more uniform heating of an adherend having a heat sink, i.e., adherends that absorb thermal energy in a non-uniform manner. A heat sink may cause certain regions of the adherend to heat more slowly because thermal energy is transferred to the heat sink. In contrast, regions not associated with a heat sink will heat rapidly. If the article of the present invention is employed, those regions not associated with a heat sink will reach the melt or deformation temperature of the substrate more quickly and heating will be slowed in this region. The regions associated with the heat sink will, however, continue to heat rapidly until the melt or deformation temperature of the substrate is reached.

Hot-melt adhesives which are heated using microwave radiation have several advantages over traditionally heated adhesives. An adhesive can be produced that can achieve its melt-flow temperature in a relatively short period of time while at the same time heating up in a very uniform fashion. The hot-melt adhesive may be used in any application where it is desirable to decrease the amount of time required to adhere two or more adherends together. Preferably, the hot-melt adhesive substrate will achieve its melt-flow temperature or activation temperature in less than 50 seconds of exposure to microwave as generated in a 750 watt microwave oven.

The melting point of the hot melt adhesive is preferably comparably low, for example, less than 100° C., so that the adhesive may be heated without vaporizing any water available in the adherend.

Surprisingly, the location of the susceptor layer on one side of the adhesive does not interfere with adhesive bonding of an adherend on the microwave radiation absorbing side of the article. After heating to the melting or activation temperature, the absorbing layer breaks up and allows adhesive to contact both adherends.

An alternate embodiment of the invention provides for a susceptor layer of a predetermined pattern of localized areas on the hot-melt or heat-curable adhesive. Such a limited coating of the microwave absorbing material allows for localized adhesion of parts at a particular location and no adhesion at other locations, even though the other location may be in contact with hot-melt or heat-curable adhesive.

The preferred items to be constructed using the microwaveable adhesive substrate of the instant invention are buffing pads commonly used in the high speed polishing of automobiles and the like. Such buffing pads are disclosed in U.S. Pat. Nos. 4,607,412, 4,907,313 and 5,001,804, all of which are herein incorporated by reference. This is an excellent example of an application where the instant invention is particularly useful, because the pads act as thermal insulators and the central hub acts as a heat sink. Both of those factors create difficulties in the use of traditional hot-melt or heat-curable adhesives for adhering the separate parts together.

Figure 2:
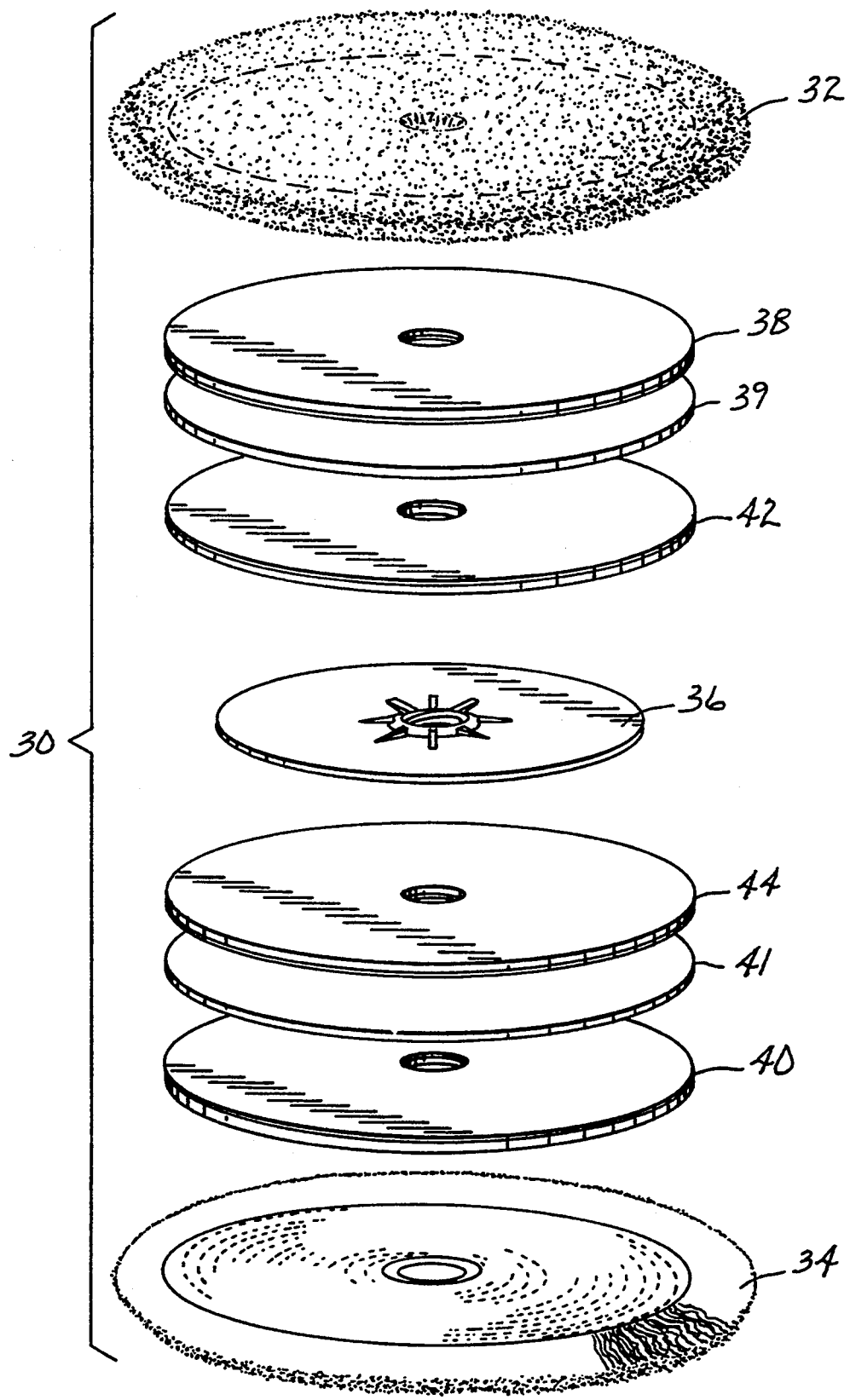
FIG. 2 is an exploded view of a buff comprising the microwave heatable adhesive substrate of the present invention.

FIG. 2 shows an exploded view of preferred buff 30. Pads 32 and 34 comprise plurality of yarn tufts protruding from one side and stitches exposed on the second side. Pads 32 and 34 are adhered to plastic hub 36 by adhesive articles 38, 40, 42 and 44, which represent the article disclosed wherein the substrate is a hot-melt or heat-curable adhesive; and adhesive 39 and 41, which are hot-melt adhesive films provided without a microwave radiation absorbing susceptor layer. Adhesive article 38 is preferably provided with the susceptor layer facing in toward the adhesive 39, and adhesive article 42 is preferably provided with the susceptor layer facing out toward adhesive 39. In this way, adhesive 39 is also melted by the microwave susceptor layer present in adhesive articles 38 and 42. Similarly, adhesive article 40 is preferably provided with the susceptor layer facing in toward adhesive 41, and adhesive article 44 is preferably provided with the susceptor layer facing out toward adhesive 41. The adhesives and adhesive articles are preferably generally coextensive with the pad, and preferably at least 5 cm in diameter. More preferably the adhesives and adhesive articles are at least 10 cm in diameter, and particularly about 20 cm in diameter.

Figure 3:
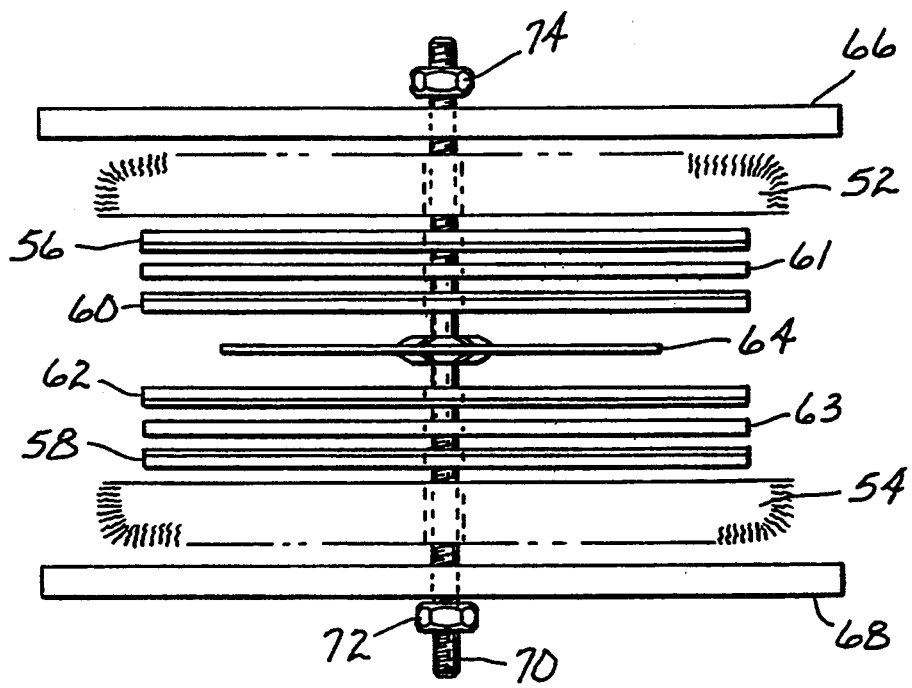
FIG. 3 is an exploded view of the structure used to assemble the buff of FIG. 2.

FIG. 3 shows the construction of the pad shown in FIG. 2, using assembly 50. Pads 52 and 54 are adhered to central hub 64 by adhesive articles 56, 58, 60 and 62 and adhesives 61 and 63. Microwave transparent disks 66 and 68 are placed on the outside of pads 52 and 54. Examples of microwave transparent materials for use in disks 66 and 68 are Teflon TM polytetrafluoroethylene and Lexan TM polycarbonate. Each of the above components is threaded on bolt 70 and are compressed using compression means 72 and 74. For example, compression means 72 and 74 may be nuts threaded on bolt 70.

In preparing the preferred buff, the stack of components shown in FIG. 3 is pressed together and exposed to microwave heating, preferably with pressure. Although pressure during the cooling of the adhesive is not required, such continued pressure may provide better penetration of the adhesive into the yarn stitches.

While the central hub may be a solid disk, preferably the hub is provided with holes to allow adhesive-to-adhesive bonding of the separate adhesive layers on opposite sides of the hub. The central hub of the buff pad facilitates bonding by acting as a heat sink. Better adhesive bonds are formed when the temperature of the adherends approximates that of the adhesive. Because the central hub acts to absorb some of the heat energy, the adhesive heats more slowly and the adherends are allowed more time to thermally equilibrate with the adhesive.

Figure 4:
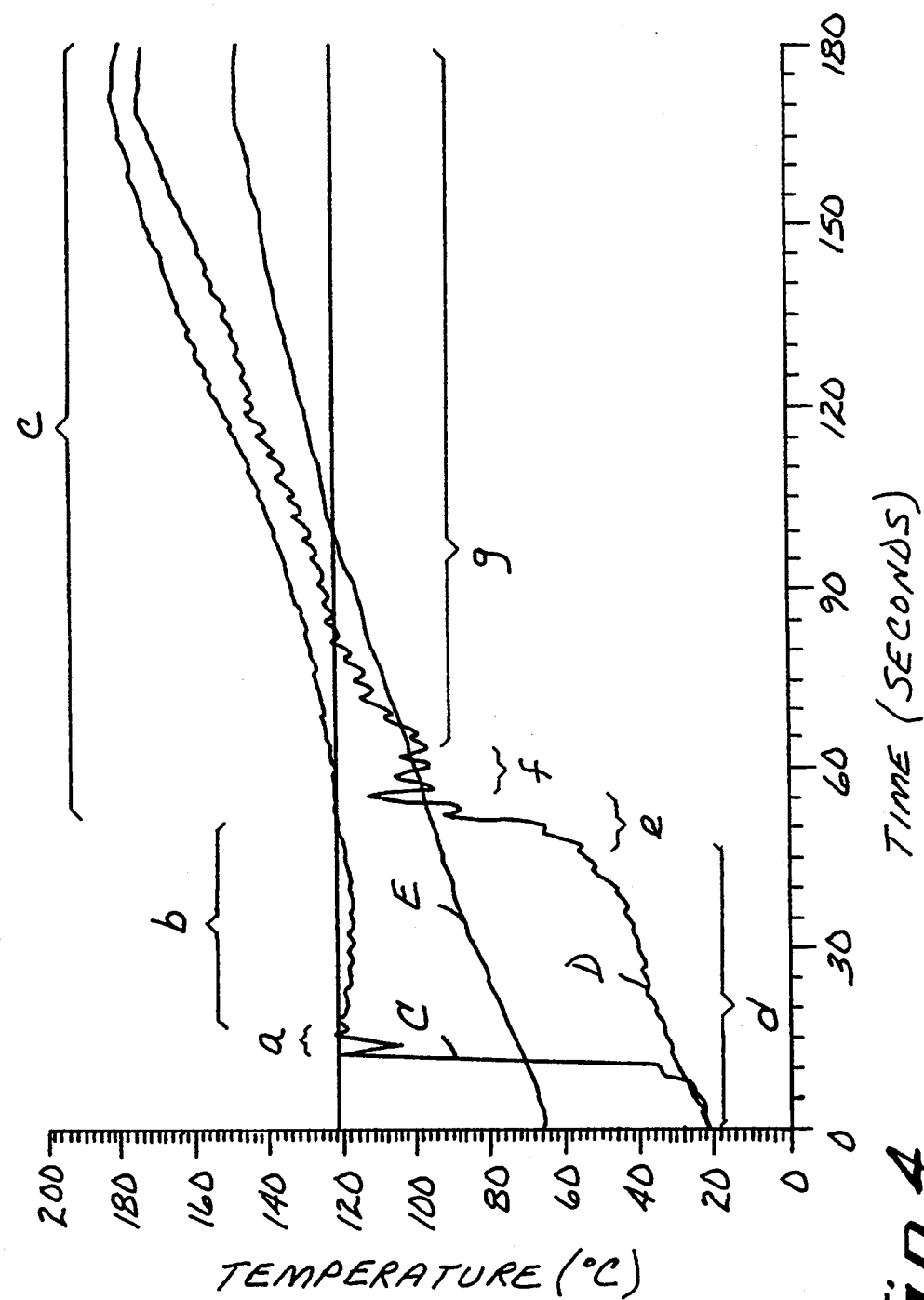
FIG. 4 shows graphs of the time versus the temperature of hot-melt adhesive at the edge and at the center of a buff assembly as it is exposed to microwave radiation.

FIG. 4 shows graphs of the time versus the temperature of the hot-melt adhesive at the edge (Curve C) and at the center (Curve D) of a buff assembly as it is exposed to microwave radiation.

This figure shows that the initial heating rate is quite large as reflected by the large initial slopes a and e of the curves C and D. Upon reaching the melting transition temperature of the substrate, the curves show relatively flat regions b and f, then the melted article continues to heat at a much slower rate after the transition temperature as shown by the attenuated slopes c and g of the curves C and D. The center of the buff pad heats more slowly than the edge because of the heat sink effect of the solid central hub. Thus, a delay in heating at the center is seen (Region d). The wariness of curves C and D is due to the oven being used at 47% power. This means that the microwave oven is only on for 47% of the time and some cooling occurs when it is off. Use of this type of heating cycle allows for heat to be transferred more uniformly by conduction throughout the object to be heated.

The following examples are provided for illustration purposes only, and are not intended to be limiting as to the scope of the present invention in any way.

EXAMPLES

Example 1

SAMPLE DESCRIPTION: All of the samples in this example were aluminum vapor coated onto 89 micrometer thick Dow DAF 916 hot-melt adhesive films. EXPERIMENTAL METHOD: The measurements were made in a 700 watt Litton Generation II microwave oven. The samples were cut to 28.6 mm×28.6 mm squares. The samples were placed on a glass slide. This was placed on a bed of glass wool in the center of the microwave oven. More glass wool was placed over the sample. The purpose of the glass wool was to reduce the sample heat loss. A Luxtron TM MEL fiber optic temperature probe was placed in the center of the sample. The time in seconds required for the sample to reach 120° C. was measured.

TABLE I

| COATING THICKNESS ANGSTROMS | TIME (SECONDS) |
| --- | --- |
| 0 | 244 |
| 45 | 244 |
| 55 | 244 |
| 77 | 12.7 |
| 90 | 11 |
| 115 | 10.5 |
| 147 | 8.5 |
| 165 | 14 |
| 190 | 31 |
| 230 | 75 |
| 290 | 93 |
| 690 | 118 |
| 2048 | 109 |

Figure 5:
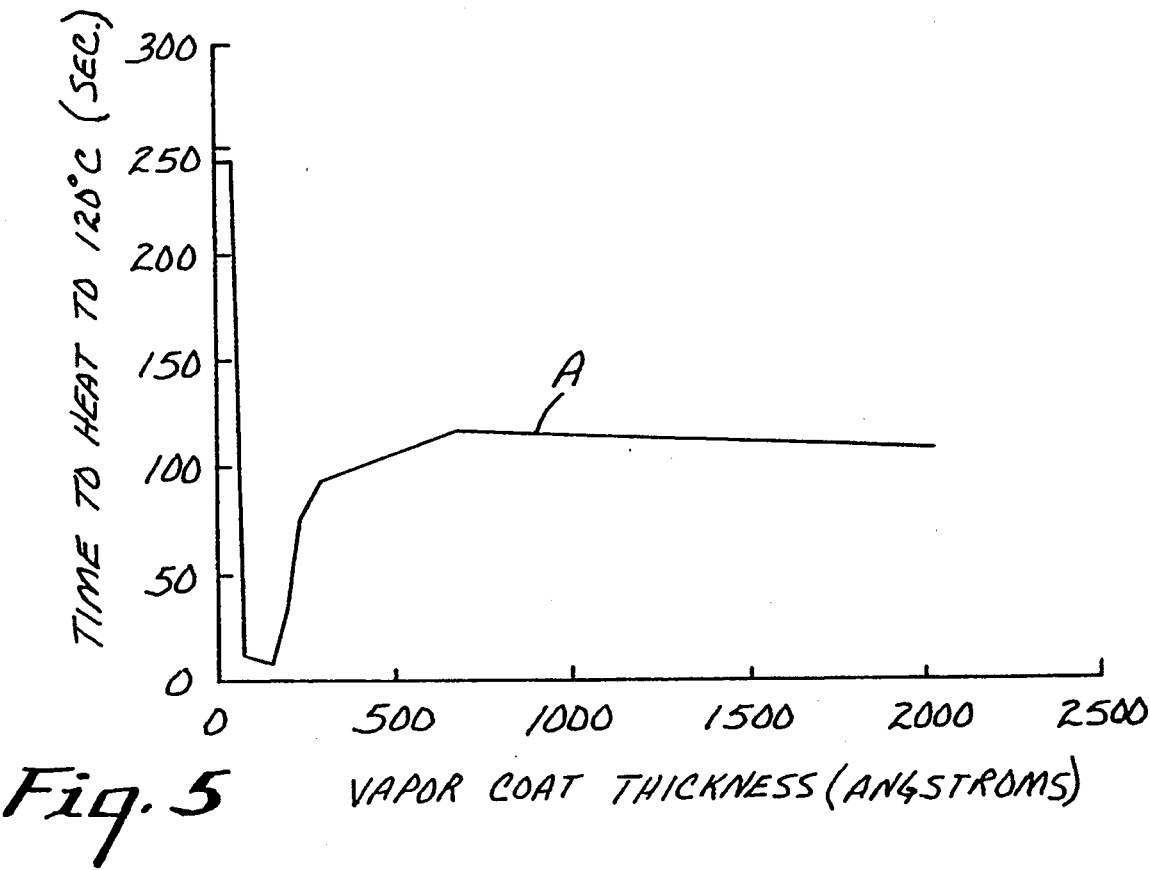
FIG. 5 is a graphical representation of the time to heat an the hot-melt adhesive of the present invention at various vapor coat thicknesses.
Figure 6:
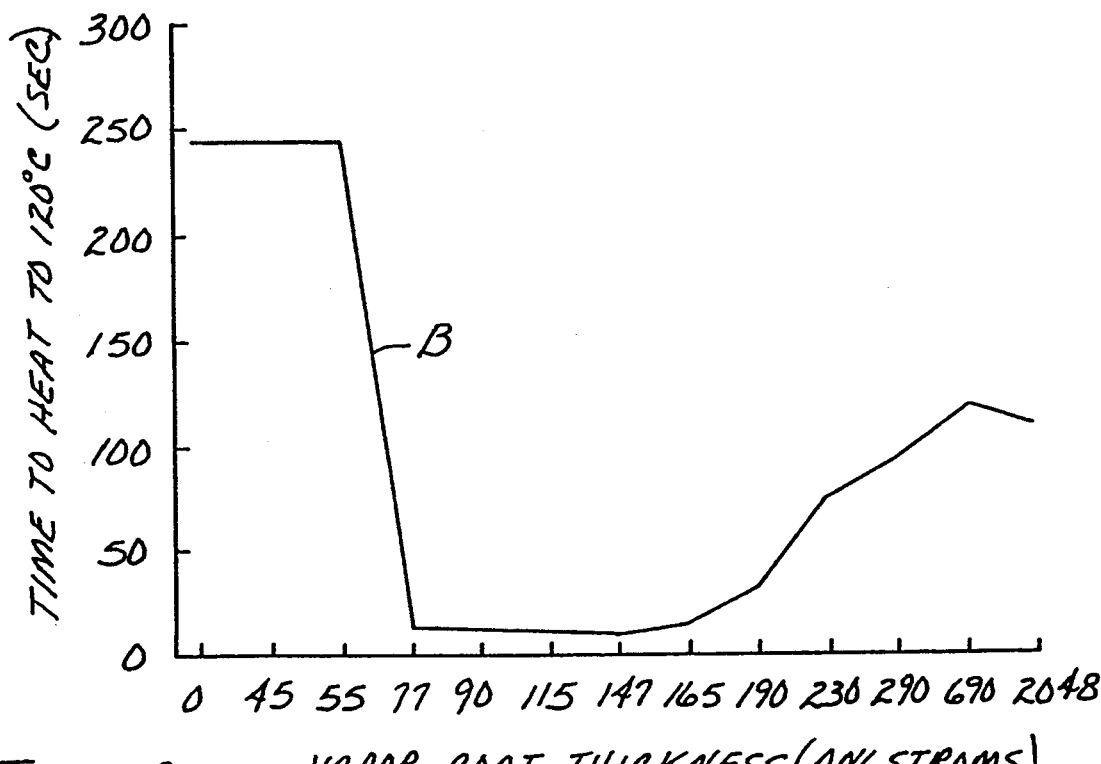
FIG. 6 is a close-up view of a section of the graph shown in FIG. 5.

FIG. 5 is a graphical representation of the information presented in Table I above. Line A indicates that there is an optimum range of vapor coat thickness for aluminum coatings for short microwave heating. FIG. 6 is an expanded view of the information presented in FIG. 5, wherein line B shows the heating time required for various vapor coat thicknesses of aluminum.

Example 2

A conventional lab coater was equipped to handle low temperature coating solutions. The coater was additionally equipped with a 20 cm wide single slot slide coating bar and a corona surface treater. A roll of poly (ethylene-co-acrylic acid) hot-melt adhesive film (DAF 916, available from Dow Chemical Corporation, 30.5 cm wide, 88 micron thick) was mounted on the coater. A methanol solution containing 25% by weight ferric tosylate, precooled to −78° C., was pumped through a static mixer into the coating bar at a rate of 32 ml/min. Simultaneously, a methanol solution of 20% by volume pyrrole, maintained at ambient temperature, was injected into the stream, at a point just prior to the static mixer, at a flow rate of 8 ml/min. The flowlines, static mixer, and coating bar were continuously cooled to −70° C. by means of a circulating fluorocarbon coolant. The mixed solution was coated onto the film surface at a web speed of 3.05 m/min. Just prior to passing the coating bar, the film surface was corona-treated at an energy level of 1.0 Joules/cm$^2$. As it moved with the web, the wet coating gradually attained ambient temperature, the solvent evaporated, and a coating of polypyrrole was formed under a crust of solidified by-products. This process was completed within 30 sec. The solidified crust was removed by passing the film surface over a cylindrical brush, continuously wetted with a spray of water, and rotated counter to the web direction. This rinsing process revealed a uniform, susceptor, transparent coating of polypyrrole tosylate. The surface was air dried and the coated film rewound. In this continuous fashion, 100 m of film was coated. The surface resistivity of the coated film was measured to be 2500 ohms/sq using a DELCOM Model 707R non-contact conductance monitor.

Upon application of microwave energy as in Example 1, this film reached 120° C. in 5 seconds, and showed no arcing.

EVALUATION OF VARIOUS VAPOR COATING LEVELS

Examples 3-12

Samples of Dow DAF 916 adhesive, 3.5 mils thick, were aluminum vapor coated one side at coating levels of 17, 62 or 3400 ohms/square.

A buff was constructed by stacking in order:
a pad, stitch exposed side up
an adhesive article, vapor-coated side up
an adhesive (3.5 mil Dow DAF 916 adhesive)
an adhesive article, vapor-coated side down
a hub
an adhesive article, vapor-coated side up
an adhesive (3.5 mil Dow DAF 916 adhesive)
an adhesive article, vapor-coated side down
a pad, stitch exposed side down This buff was placed in a 650 watt Tappan microwave, 2450 MHz, with rotating table. A clamping fixture consisting of 10.2 cm air cylinder with two polycarbonate plates for clamping, capable of applying 1112-5026 newtons on buff, was used to compress the buff during heating.

Buffs are assembled, each with a different level of vapor coating. The experiment is a 3 factorial experiment with vapor coating, microwaving time and clamping as the three variables. There are three responses that are tested: 1) % tufts bonded (sample of 10 tufts per buff are examined); 2) % of hub not melted (visual measurement); and 3) % bond of adhesive to bond (visual measurement).

| Example | Pressure (kPa) | Time (min-sec) | Vapor Coating (ohms/square) |
|---|---|---|---|
| 3 | 137.9 | 1 15 | 3400 |
| 4 | 620.5 | 1 15 | 3400 |
| 5 | 137.9 | 1 15 | 3400 |
| 6 | 620.5 | 2 30 | 3400 |
| 7 | 137.9 | 2 30 | 17 |
| 8 | 620.5 | 1 15 | 17 |
| 9 | 137.9 | 1 15 | 17 |
| 10 | 620.5 | 2 30 | 17 |
| 11 | 379.2 | 1 53 | 62 |
| 12 | 379.2 | 1 53 | 62 |

| | RESULTS | | |
|---|---|---|---|
| Example | % Tuft Bonds | % Hub Not Melted | % Bond to Hub |
| 3 | 0 | 100 | 0 |
| 4 | 10 | 100 | 5 |
| 5 | 90 | 75 | 98 |
| 6 | 80 | 98 | 100 |
| 7 | 0 | 100 | 0 |
| 8 | 40 | 100 | 1 |
| 10 | 10 | 95 | 100 |
| 11 | 90 | 100 | 100 |
| 12 | 80 | 100 | 100 |

Results shown an air cylinder pressure of 379.2 kPa or greater is acceptable. Although all vapor coating levels did work to melt the adhesive, the 62 ohms per square is preferred for buff construction.

Examples 13-14

Influence of Vapor Coating on Heating Time

Comparative Example 13 is 3.5 mils thick Dow DAF 916 film that has not been vapor coated.

Example 14 is same film adhesive but aluminum vapor coated to 62 ohms/square.

Equipment 650 watt Tappan microwave, 2450 MHz, with rotating table.

The examples were placed in the oven. The microwave was turned on at full power and left on until samples were melted.

| Example 13 Standard Adhesive | Example 14 Vapor Coated Adhesive |
|---|---|
| 10 minutes | 5 seconds |

Examples 15-17

Buffs are assembled as described in Example 11. Three types of heating methods were used:

15. The buff is clamped in a fixture and the assembly is then put in a convection oven set at 121° C. A thermometer is inserted into the buff. Then record the time it takes for the adhesive to reach melt point (110° C.).

16. The buff is heated in a heated press. The two press platens are heated to 162° C. A thermometer is inserted into the buff. Compress buff with 181.4 kg pressure. Recorded the time it takes for the adhesive to reach melt point (110° C.).

17. The buff is clamped in a fixture and put into 650 watt microwave as described in Examples 3-12.

| Example | Heating Method | Time to Reach Melt Point |
|---|---|---|
| 15 | Convection Oven | 3 hours |
| 16 | Heated or Hot Platten Press | 20 minutes |
| 17 | Microwave | 1 minute 35 seconds |

Example 18

Dow DAF 916 hot-melt adhesive was vapor coated with aluminum to a thickness of about 250 angstroms using a mask to create patterns of vapor coated areas. The mask consisted of paper with several squares 6.35 mm, 12.7 mm and 25.4 mm per side cut in the paper.

Some vapor coated squares were placed in a 650 watt kitchen grade microwave and heated for a few seconds. The 25.4 mm and 12.7 mm squares melted, but the 6.35 mm squares did not. Even when heated for one minute, the 6.35 mm squares showed only marginal signs of melting. cl Example 19

The experiment of example 18 was repeated in a 6 kW oven manufactured by Raytheon, wherein a dummy water load was placed in the oven for protection. The water load absorbed approximately 3 kW of energy, leaving 3 kW available for absorption by the adhesive article.

The 25.4 and 12.7 mm squares began melting with the oven on for only 1 second. The 6.35 mm squares did not melt even when the oven was on for 30 seconds. Strips were cut 6.35 mm×12.7 mm, 6.35 mm×25.4 mm, 6.35 mm×50.8 mm and a very narrow strip approximately 0.8 mm×50.8 mm. All but the very narrow strip melted very quickly. In each case where melting occurred, there was no melting of the adhesive immediately adjacent to vapor coated areas.

For this particular adhesive and vapor-coating thickness, the coated area is preferably greater than 0.40 cm².

Experiment 20

Figure 7:
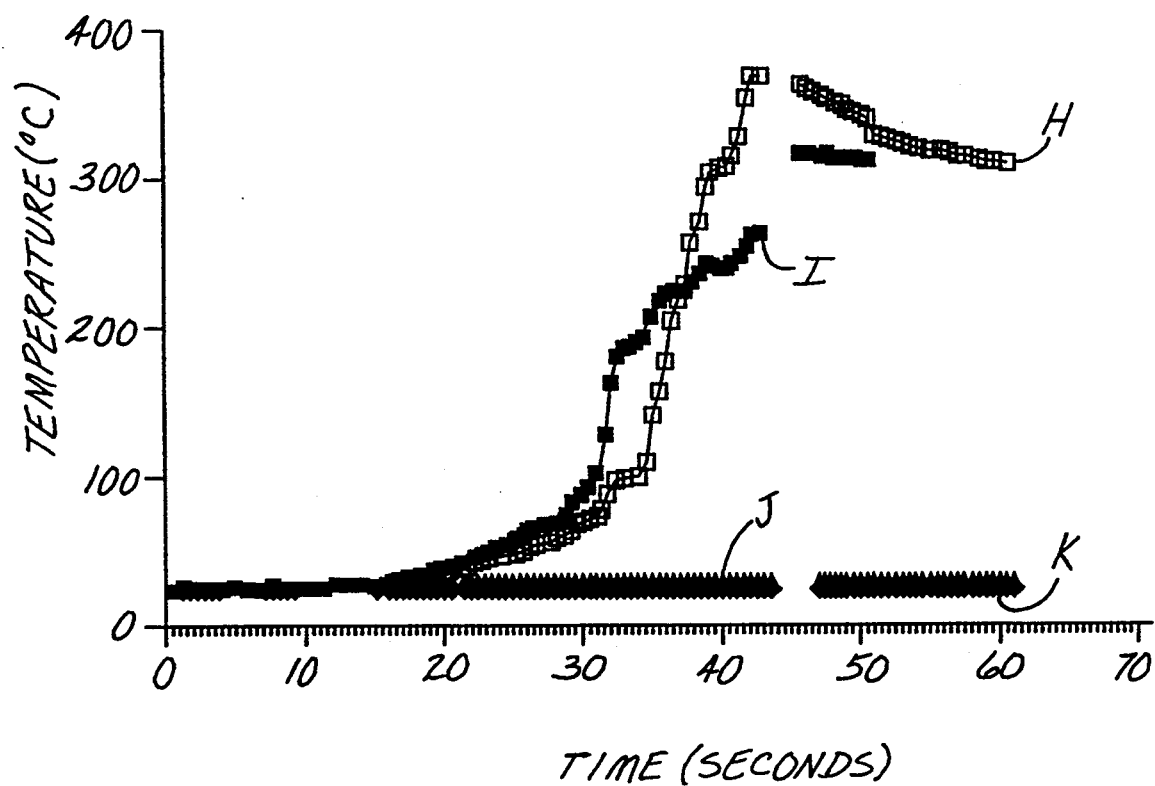
FIG. 7 shows the heating curves of various compositions of hot-melt adhesive when subjected to microwave radiation.

FIG. 7 shows the heating curves of various compositions of hot-melt adhesive when subjected to microwave radiation.

Curves h and i depict the heating rate of hot-melt adhesive that has been vapor coated with aluminum, one embodiment of the present invention.

Curve j shows the heating rate of aluminum vapor coated hot-melt adhesive that has been melted prior to microwave irradiation by being place in a convection oven. The preheated vapor coated adhesive was allowed to cool before being subjected to microwave radiation.

Curve k shows the heating rate of non-vapor coated hot-melt adhesive. Like the sample of curve j, this sample was heated until melted in a convection oven and cooled before the sample was subjected to microwave radiation.

The curves show that unmelted vapor coated hot-melt adhesive heats more rapidly than either non-vapor coated hot-melt adhesive or vapor coated hot-melt adhesive that has been previously melted.

Both the premelted vapor coated adhesive and the premelted non-vapor coated adhesive show little microwave absorption and appear relatively transparent, demonstrating that the disclosed article heats rapidly until the melting or deformation temperature is reached and becomes relatively transparent to microwave radiation thereafter.

EXPERIMENTAL

All adhesive samples were Dow DAF 916 adhesive. The premelted vapor coated hot-melt adhesive was obtained by melting eight sheets of 3.5 mil thick adhesive of about 20 cm in diameter (approximately 20 g) that had been vapor coated with about 140 angstroms of aluminum. The sheets were melted in a standard laboratory oven at about 177° C., with occasional stirring. Similarly, an equivalent amount on non-vapor coated adhesive was melted.

A small hole was bored into each melted sample and a Luxtron TM MEL fiber optic temperature probe was inserted into each hole. In addition, eight sheets of vapor coated adhesive were stacked and folded together. Two probes were inserted into this sample.

All three samples were placed in a Raytheon industrial microwave oven (6.4 kW, 2450 Mhz) and were simultaneously exposed to microwave radiation. The oven was operated at 47% power level (Cycle time of 47% on and 53% off). The temperatures of the samples were monitored with the inserted temperature probes and the microwave was stopped when the highest temperature went above 300° C.

We claim:

1. A microwave actuable self-limiting adhesive article for use in a microwave oven which can be used to bond adherends, comprising:
    a) a substrate consisting of a hot-melt or heat-curable adhesive; and
    b) a microwave susceptor layer of at least electrically semi-conductive microwave radiation absorbing material that is disposed on at least a portion of said substrate such that said substrate provides physical support to said susceptor layer, said susceptor layer being responsive to exposure to microwave radiation for raising the temperature of said substrate above a desired level sufficient to melt said substrate and thereby deactivate said susceptor layer by destruction of said physical support through melting of said substrate when said desired temperature level is achieved.

2. The article of claim 1, wherein said substrate melts at a temperature between 60° and 150° C.

3. The article of claim 1, wherein said substrate melts at a temperature between 80° and 120° C.

4. The article of claim 1, wherein the substrate is selected from the group consisting of ethylene vinyl acetate, ethylene ethyl acrylate, ethylene acrylic acid, ethylene methacrylic acid, polyethylene, polyamides, ethylene vinyl esters and mixtures thereof.

5. The article of claim 1, wherein the substrate is selected from the group consisting of alkyd, coumarone-indene, phenolic, rosin and terpene resins and mixtures thereof.

6. The article of claim 1, wherein the substrate is selected from the group consisting of heat activatable phenolic resins, amino resins, nitrile rubbers, neoprene rubbers, epoxy resins, isocyanate polymers, vinyl monomers and mixtures thereof.

7. The article of claim 1, wherein the substrate is an ethylene acrylic acid/polyethylene blend.

8. The article of claim 1 wherein said susceptor layer has a sheet resistivity of between 5 and 5000 ohms per square.

9. The article of claim 1 wherein said susceptor layer has a sheet resistivity of between 15 and 1000 ohms per square.

10. The article of claim 1 wherein said susceptor layer comprises less than 1% by weight of said article.

11. The article of claim 1 wherein said susceptor layer comprises less than 0.01% by weight of said article.

12. The article of claim 1 wherein the susceptor layer has a sheet resistivity greater than 0.2 ohm per square.

13. The article of claim 1 wherein said susceptor layer is a metal selected from the group consisting of iron, nickel, stainless steel, tin, titanium, magnesium, aluminum, silver, tungsten, copper, gold and chromium.

14. The article of claim 1 wherein said susceptor layer is between about 60 and 1000 angstroms thick.

15. The article of claim 1 wherein said susceptor layer is between about 70 and 170 angstroms thick.

16. The article of claim 1 wherein said susceptor layer is a polymeric coating selected from the group consisting of polypyrroles, polyanilines and polythiophenes.

17. The article of claim 1 wherein the susceptor layer is substantially coextensive with the substrate.

* * * * *

UNITED STATES PATENT AND TRADEMARK OFFICE
CERTIFICATE OF CORRECTION

PATENT NO.: 5,340,649

DATED: 8-23-94

INVENTOR(S): David C. Roeker, David F. Slama and William F. Sheffield

It is certified that error appears in the above-identified patent and that said Letters Patent is hereby corrected as shown below:

Column 9, Line 36, "adhesive to bond" should read, --adhesive to hub--.

Column 10, Line 56, "cl Example 19" should read, --Example 19-- and the corrected text should be moved down a line and said text should be centered in the column.

Signed and Sealed this

Eighteenth Day of March, 1997

Attest:

BRUCE LEHMAN

Attesting Officer

Commissioner of Patents and Trademarks